(12) United States Patent
Istomin et al.

(10) Patent No.: US 12,095,771 B2
(45) Date of Patent: Sep. 17, 2024

(54) SPLIT INPUT AND OUTPUT REMOTE ACCESS

(71) Applicant: AT&T Intellectual Property I, L.P., Atlanta, GA (US)

(72) Inventors: Mikhail Istomin, Brooklyn, NY (US); Wei Wang, Harrison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 517 days.

(21) Appl. No.: 17/398,193

(22) Filed: Aug. 10, 2021

(65) Prior Publication Data

US 2023/0048931 A1    Feb. 16, 2023

(51) Int. Cl.
*G06F 9/451*     (2018.01)
*H04L 9/40*      (2022.01)

(52) U.S. Cl.
CPC ............ *H04L 63/105* (2013.01); *G06F 9/452* (2018.02); *H04L 63/102* (2013.01)

(58) Field of Classification Search
CPC ...... H04L 63/105; H04L 63/102; G06F 9/452
USPC ............................................................ 726/3
See application file for complete search history.

(56) References Cited

U.S. PATENT DOCUMENTS

| | | | |
|---|---|---|---|
| 9,147,068 B1 * | 9/2015 | Haddad ................. | H04W 12/02 |
| 2007/0073823 A1 * | 3/2007 | Cohen ................. | G06Q 10/107 |
| | | | 709/207 |
| 2011/0296510 A1 * | 12/2011 | Hatlelid .................. | H04L 63/08 |
| | | | 726/7 |
| 2012/0079575 A1 * | 3/2012 | Yue ........................ | H04L 63/123 |
| | | | 726/3 |
| 2019/0253269 A1 * | 8/2019 | Keane .................. | H04L 63/0254 |
| 2021/0288973 A1 * | 9/2021 | Dimble ............... | H04W 12/108 |
| 2021/0294926 A1 * | 9/2021 | Duffy ....................... | G06F 21/84 |
| 2022/0046415 A1 * | 2/2022 | Chiang ............... | H04L 63/0853 |
| 2022/0138746 A1 * | 5/2022 | Rodriguez .......... | H04L 63/0853 |
| | | | 705/43 |
| 2022/0231837 A1 * | 7/2022 | Olszowy .............. | G06K 7/1413 |
| 2023/0139775 A1 * | 5/2023 | Duffy .................... | G06F 1/1618 |
| | | | 726/2 |
| 2023/0179589 A1 * | 6/2023 | Kopack ............... | H04L 63/0492 |
| | | | 726/4 |

OTHER PUBLICATIONS

Sharp et al., Enhancing Web Browsing Security on Public Terminals Using Mobile Composition, MobiSys '08, Jun. 17-20, 2008, pp. 94-104 (Year: 2008).*

* cited by examiner

*Primary Examiner* — Thanh T Le
(74) *Attorney, Agent, or Firm* — Guntin & Gust, PLC; Atanu Das (57) ABSTRACT

A system allows for higher security guarantees on public or shared or even compromised equipment, which may be designated as untrusted equipment, without a need to install additional software on it or connect to it outside of general browser interactions. Based on this system, even if it is compromised, proper information separation may ensure security of the sensitive parts of data. That is, trusted information will only go to (outputs) or come from (inputs) trusted devices and insensitive information can go to or come from both trusted and untrusted devices.

20 Claims, 7 Drawing Sheets

SPLIT INPUT AND OUTPUT REMOTE ACCESS

BACKGROUND

A typical communication system consists of input/output (I/O), networking, and compute resources. Although computing resources have been moved into the cloud, I/O stays local. I/O interactions with remote resources may be done in a unified stream. Conventionally, input (e.g., keyboard or mouse) and output (video displays or audio outputs) are bundled together and typically considered with the same level of security. Yet that is not always the case, as sometimes the input may be trusted, but not the output or vice versa, or both are not trusted.

This background information is provided to reveal information believed by the applicant to be of possible relevance. No admission is necessarily intended, nor should be construed, that any of the preceding information constitutes prior art.

SUMMARY

A zero-trust security is considered an information technology security model that requires strict identity verification for every person and associated device attempting to access resources on a network, regardless of whether the device is within or outside of the network perimeter. Methods, systems, and apparatuses, among other things, as described herein may provide for split input and output remote access for communication systems, such as communication systems with zero-trust security. The disclosed system may allow for high security guarantees on public equipment (e.g., untrusted equipment) without a need to install additional software on the public equipment or connect to the public equipment outside of general browser interactions. In other words, minimal to no trusted software would need to be invested into the public equipment. Even if the public equipment is compromised, proper information separation disclosed herein may ensure security of the sensitive parts of data.

In an example, an apparatus may include a processor and a memory coupled with the processor that effectuates operations. The operations may include receiving a request from a first device for a session with a server; determining that the first device has a first trust level; in response to determining the first device is untrusted, communicating a session identifier to the first device; receiving the session identifier from a second device; determining that the second device has a second trust level; linking the first device and the second device to the session; sending information to be communicated for the session, wherein the first device displays a first subset of the information that is displayable for devices designated at the first trust level; and wherein the second device displays a second subset of the information that is displayable for devices designated at the second trust level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
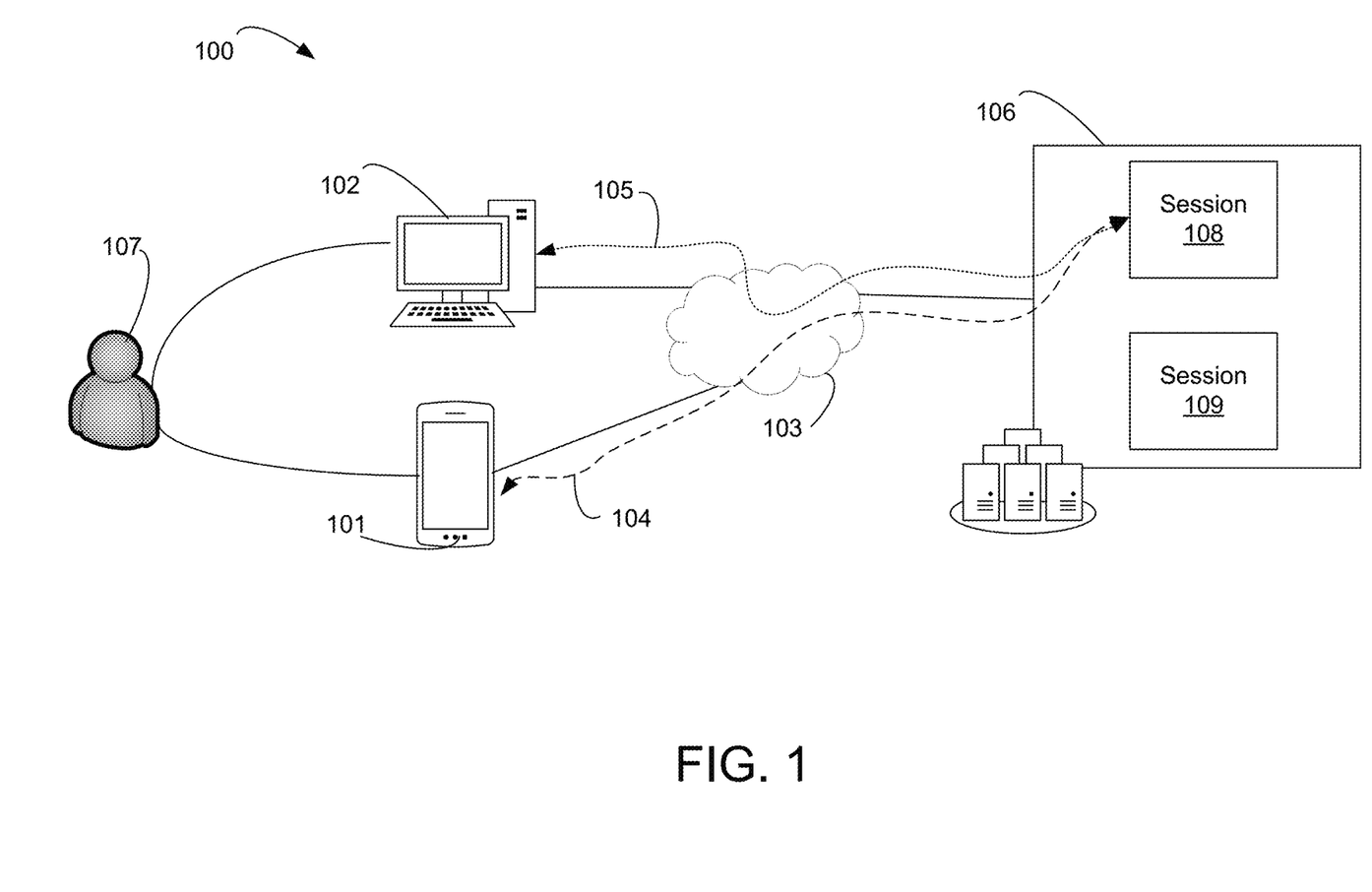
FIG. 1 illustrates an exemplary system to dynamically split input and output remote access for zero trust systems, among other things.

FIG. 1 illustrates an exemplary system to dynamically split input and output remote access, which may be used for zero trust systems, among other things. System 100 may include mobile device 101, computer 102, and server 106. User 107 may interface with mobile device 101 or computer 102. Server 106 may be in a data center and may have one or more connected sessions, such as session 108 or session 109. The devices of system 100 may be communicatively connected with each other and network 103 (e.g., a cloud network). Network 103 may include its own routers, access points, DNS servers, firewalls, or the like. Mobile device 101 or computer 102 may include a laptop, tablet, autonomous vehicle (e.g., SAE Intl level 3 to level 5 automation), or mobile phone, among other things. The devices of system 100 may include wireless or wired devices, such as servers, routers, switches, desktop computers, or the like.

In an example scenario, in a hotel lounge, user 107 may attempt to listen in on a conference call on computer 102 (e.g., a public computer). The input (e.g., keyboard and mouse) on the computer in this case, cannot be trusted with sensitive information, conventionally thus the user would have to replace them with secured inputs. The output (e.g., the public monitor) may also not be trusted. Information, such as the speaker's face, may be non-sensitive, but the speaker's audio may be sensitive.

The disclosed subject matter allows for different levels of trust on inputs or outputs. The disclosed subject matter allows separation for not only input and output streams from each other, but also sensitive and non-sensitive information. In cases where inputs are not trustworthy, a secondary input may be in place to replace the non-trustworthy inputs, in a bring your input (BYOI) manner. Similarly, when outputs are not trustworthy, a secondary output may be brought, in a bring your output (BYOO) manner. Impact on synchronization and cohesion between each resulting part is minimal.

Figure 2:
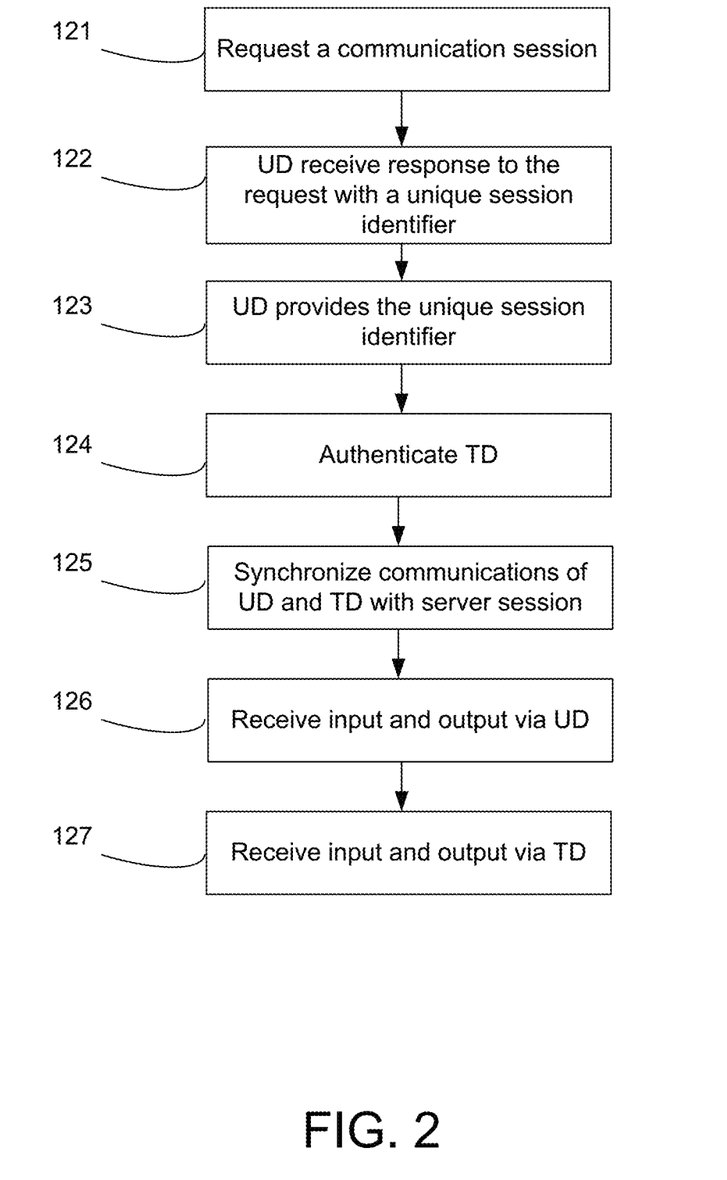
FIG. 2 illustrates an exemplary method to dynamically split input and output remote access for zero trust systems, among other things.

FIG. 2 illustrates an exemplary method to dynamically split input and output remote access, among other things. At step 121, an application (e.g., a browser) on computer 102 (e.g., an untrusted device (UD)) may be opened and request a communication session. The browser of untrusted computer 102 (herein UD computer 102) may be directed to server 106 (e.g., via a remote desktop provider (RDP) uniform resource locator (URL) or other specific application). At step 122, server 106 may respond to the requests of step 121 with a unique session identifier (ID), which may be generated randomly. At step 123, mobile device 101 may be considered a trusted device (TD) and receive the session ID of step 122. Trusted mobile device 101 (herein TD mobile device 101) may read in the session ID via a scanning of a QR code, string of numbers/letters, or the like from the display of UD computer 102, or via a wired or wireless link.

With continued reference to FIG. 2, at step 124, TD mobile device 101 is used with session ID and personal credentials (e.g., any sort of authentication, e.g. (RSA) Token, fingerprint, One Time Password (OTP), etc.) to authenticate the devices that correspond to user 107 (e.g., TD mobile device 101 and UD computer 102) with server 106. At step 125, both UD computer 102 and TD mobile device 101 synchronize their communications with session 108. In an example, server 106 (e.g., RDP) initializes session 108 with UD computer 102 and associates session 108 with user 107. In addition, a secure connection is established for TD mobile device 101 with session 108. At step 126, receiving input and output via UD computer 102 when the information for session 108 is indicated to be at an untrusted level. At step 127, receiving input and output via TD mobile device 101 when the information for session 108 is indicated to be at an untrusted level or trusted level. The untrusted level input may be shown simultaneously on the TD mobile device 101 and UD computer 102, while the trusted level information is shown just on TD mobile device 101. Note that the from RDP side both UD computer 102 and TD mobile device 101 are treated as part of the same session (e.g., session 108), while TD mobile device 101 will be able to have more sensitive interactions that require a trusted device.

Figure 3A:
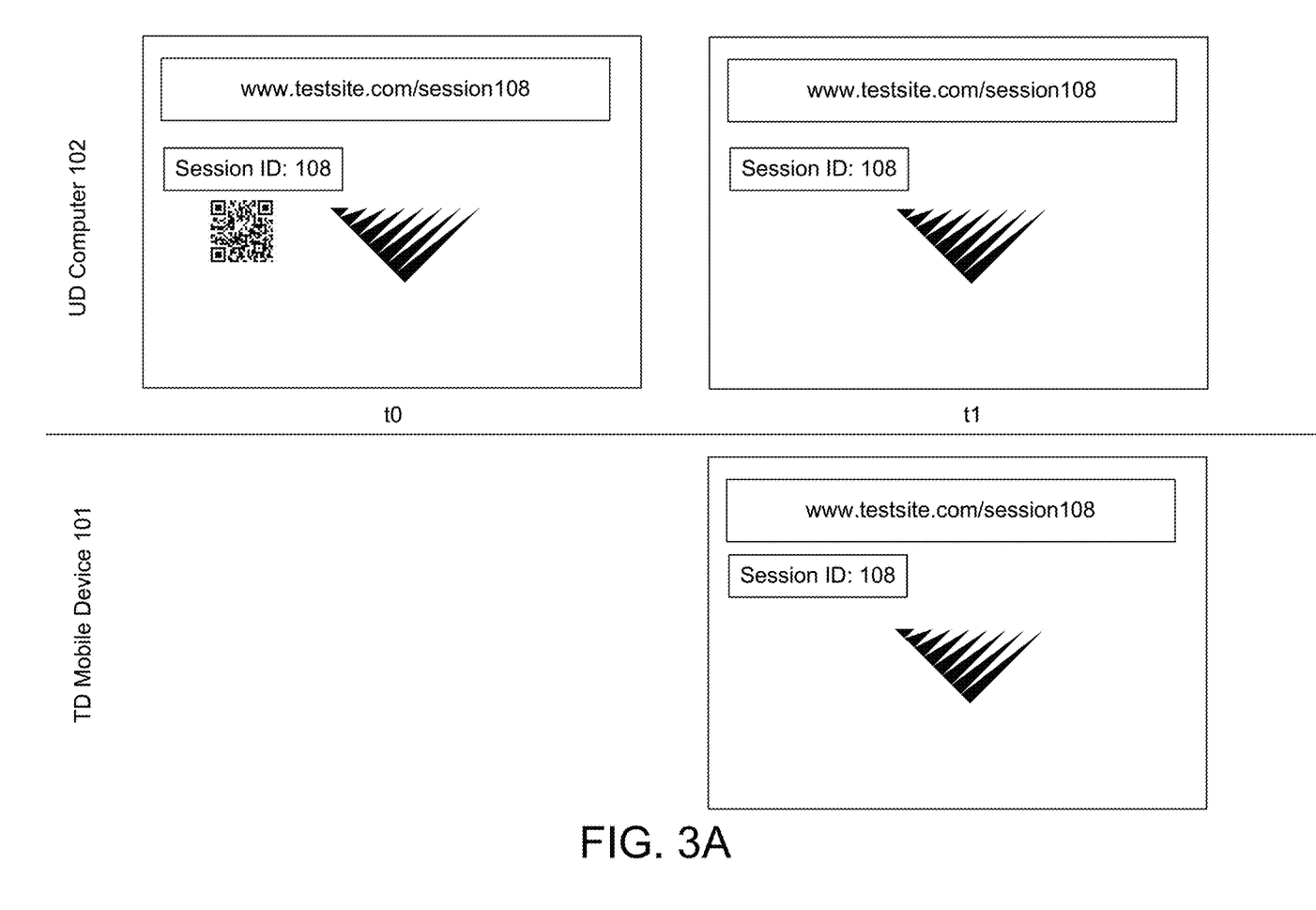
FIG. 3A illustrates example scenario associated with dynamically split input and output remote access for zero trust systems.
Figure 3B:
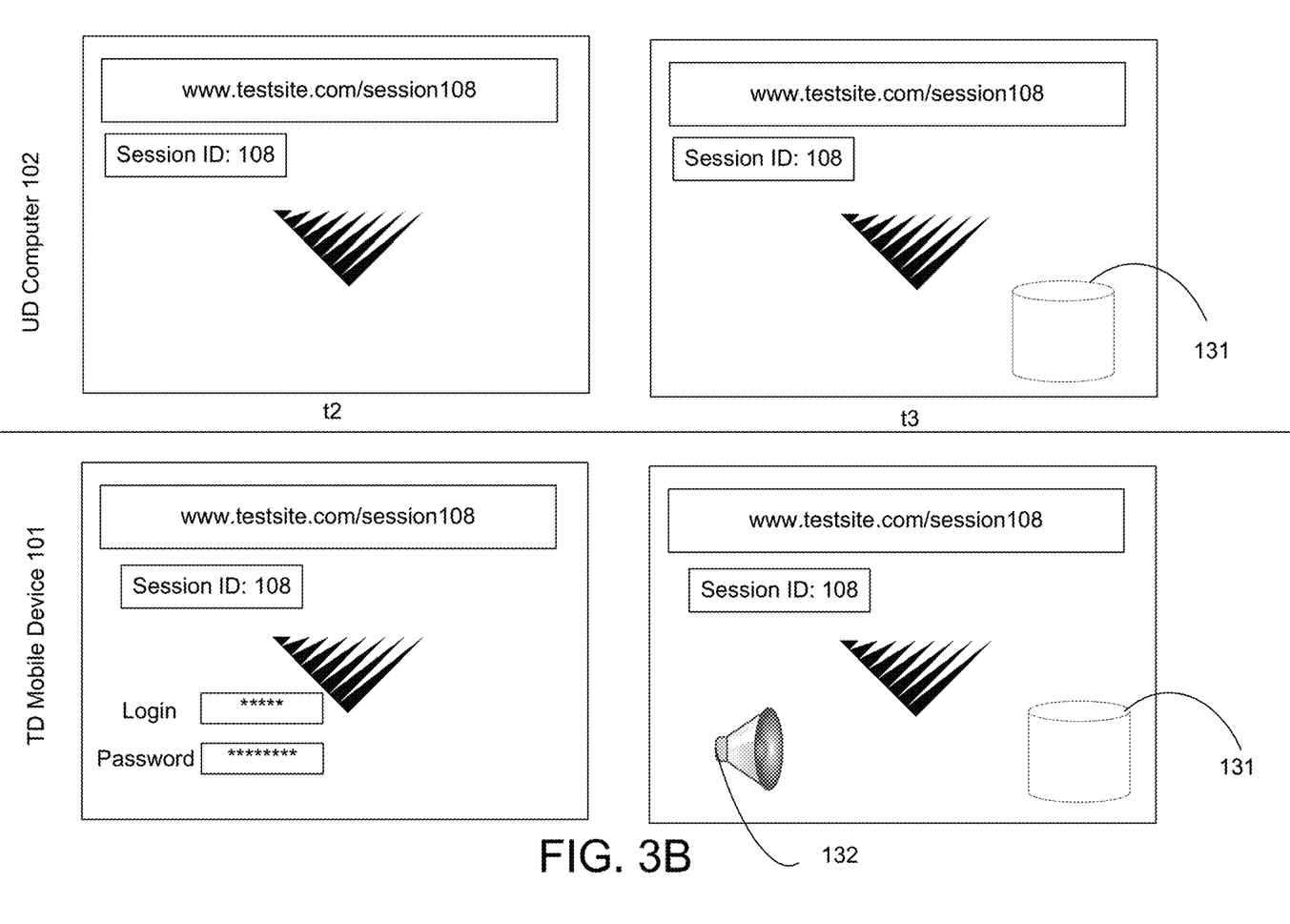
FIG. 3B illustrates example scenario associated with dynamically split input and output remote access for zero trust systems.
Figure 3C:
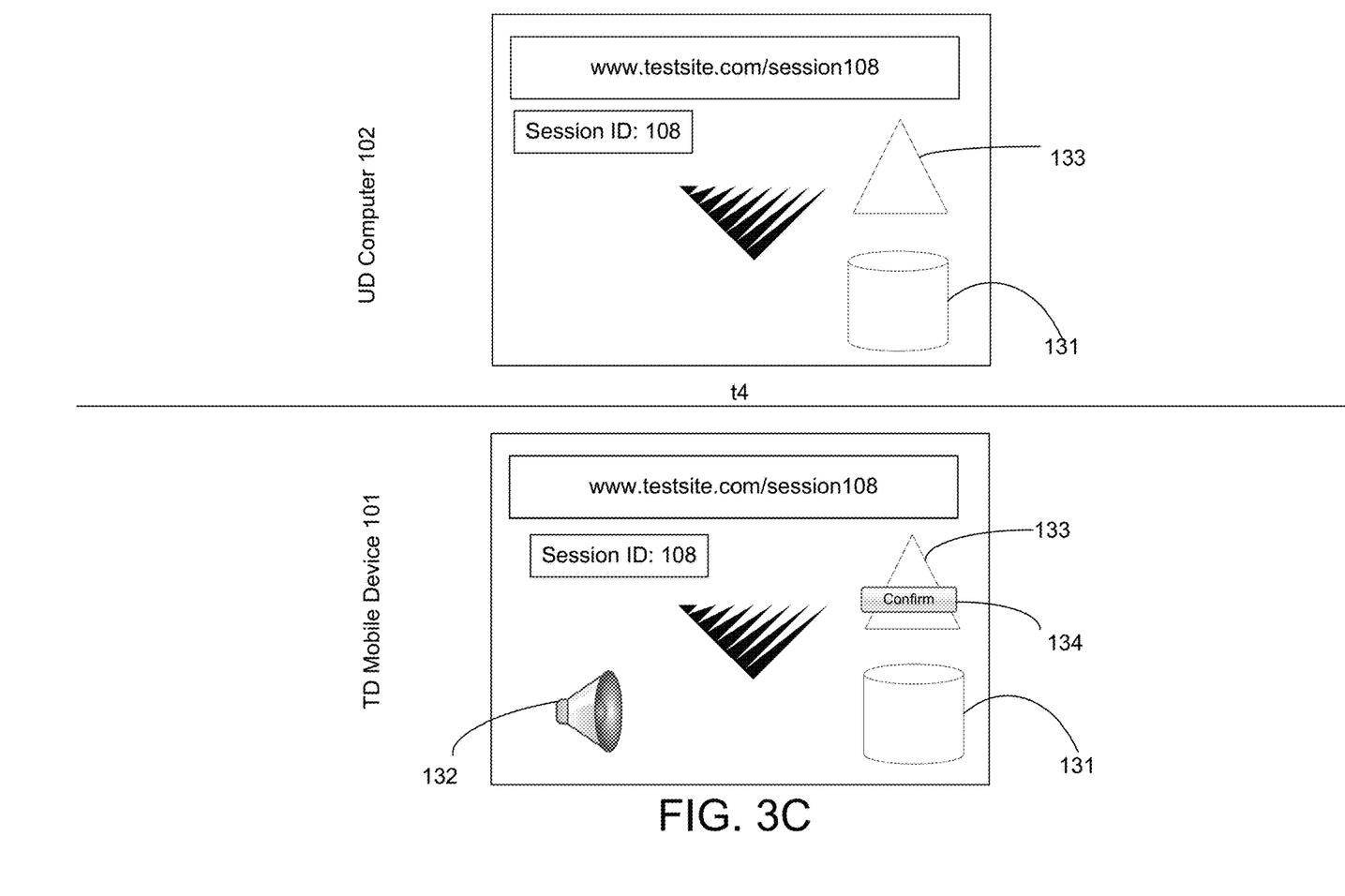
FIG. 3C illustrates example scenario associated with dynamically split input and output remote access for zero trust systems.

FIG. 3A-FIG. 3C illustrate example scenarios associated with dynamically split input and output remote access. As shown, at time t0, the display of UD computer 102 displays a session ID 108 and corresponding QR code for the session, in response to a specific URL. Between time t0 and time t1, TD mobile device 101 may scan or otherwise input session information that provides TD mobile device 101 the same session as UD computer 102. In this case, at time t1, the display of UD computer 102 may display identical information of the display of TD mobile device 101. UD computer 102 may communicate session ID 108 via machine-to-machine communication that may be wired or wireless (e.g., Bluetooth, Wi-Fi, near field communication, etc.).

With reference to FIG. 3B, at time t2, the displays of UD computer 102 and TD mobile device 101 may not be identical. As shown, since TD mobile device 101 is trusted it may show a login and a password prompt, while UD computer 102 does not. Alternatively, both devices, TD mobile device 101 and UD computer 102, may display the login or password prompt, while only TD mobile device 101 may be able to enter the login or password. In this alternative, UD computer 102 may just display asterisks or the like in the login or password prompts when TD mobile device 101 receives the login and password via its interface. Along the same line, UD computer 102 may only displayed a blurred or alternative version of what is displayed on TD mobile device 101.

At time t3, after entering username and password via TD mobile device 101, multiple times may be displayed on both UD computer 102 and TD mobile device 101. TD mobile device 101 and UD computer 102 may display identical information except that TD mobile device 101 has additional item 132. In another example, item 132 may be an indication of audio. Again, based on trust level (e.g., trusted or untrusted), audio may be communicated via TD mobile device 101 and not via UD computer 102. In another example, audio may be received by UD computer 102 from a remote device, but audio may not be received using a microphone of UD computer 102. With reference to FIG. 3C, at time t4, UD computer 102 and TD mobile device 101 may display identical items except for item 134 and item 132. Again, this is due to the trusted status of TD mobile device 101 and untrusted status of UD computer 102. In this scenario shown in FIG. 3C, UD computer 102 may be trusted to the point where it may select an option or request associated with 133, but not a trust level to go past a certain action with item 133. Here, in this example, TD mobile device 101 may show a confirmation button which may allow an action that may be executed (e.g., displayed) on UD computer 102 and TD mobile device 101.

For additional perspective, a secure and convenient interface might not always be readily available for access. Mobile devices 101, such as smart phones may provide mobility but can be rather awkward to use in some situations. For example, small screens and lack of physical keyboard may be inconvenient when interacting with large screen interfaces, such as remote desktop, or need to type a large amount of text. There may be situations in which a user may gain access to full-size devices in some public location such as library or internet café, however there is no guarantees about security of such devices. Even if the public computers (e.g., UD computer 102) is just used to connect to a secure virtual/remote desktop, there may be a key logger or screen monitor that would copy all inputs and outputs of computer 102 and send the logged inputs to the unscrupulous third party. Hence such devices may not be trusted with anything sensitive.

The disclosed subject matter may assist in securing a network while performing certain tasks through use of zero trust systems. For example, a higher level of secured interactions from an untrusted terminal/computer. For the disclosed system the server-side data (e.g., data of server 106) may be labeled as to whether it is sensitive or not (e.g., the threshold trust level needed for access to the data). In general, items (e.g., password input fields) can be labeled automatically; as well as a client device (e.g., TD mobile device 101) can have capabilities to label items on the fly. Company or situation specific information may have predefined labels (e.g., tags) available so that the system may identify which input or output parts to use for interaction.

It is contemplated that a device (e.g., database or server) may generate one type of reply for the untrusted connection (e.g., censoring sensitive data) and another for trusted connection (e.g., not censoring, or just sending censored part). The trusted device (e.g., TD mobile device 101) does not have to input or output (e.g., display) everything the untrusted device (e.g., UD computer 102) inputs or outputs. The trusted device input or output may be limited to just need-to-secure items. In another example, a backend device may respond to the same request with two replies: 1) a first reply is censored which is for the untrusted device, and 2) a second reply is uncensored or just the parts that were uncensored for the trusted side.

Figure 4:
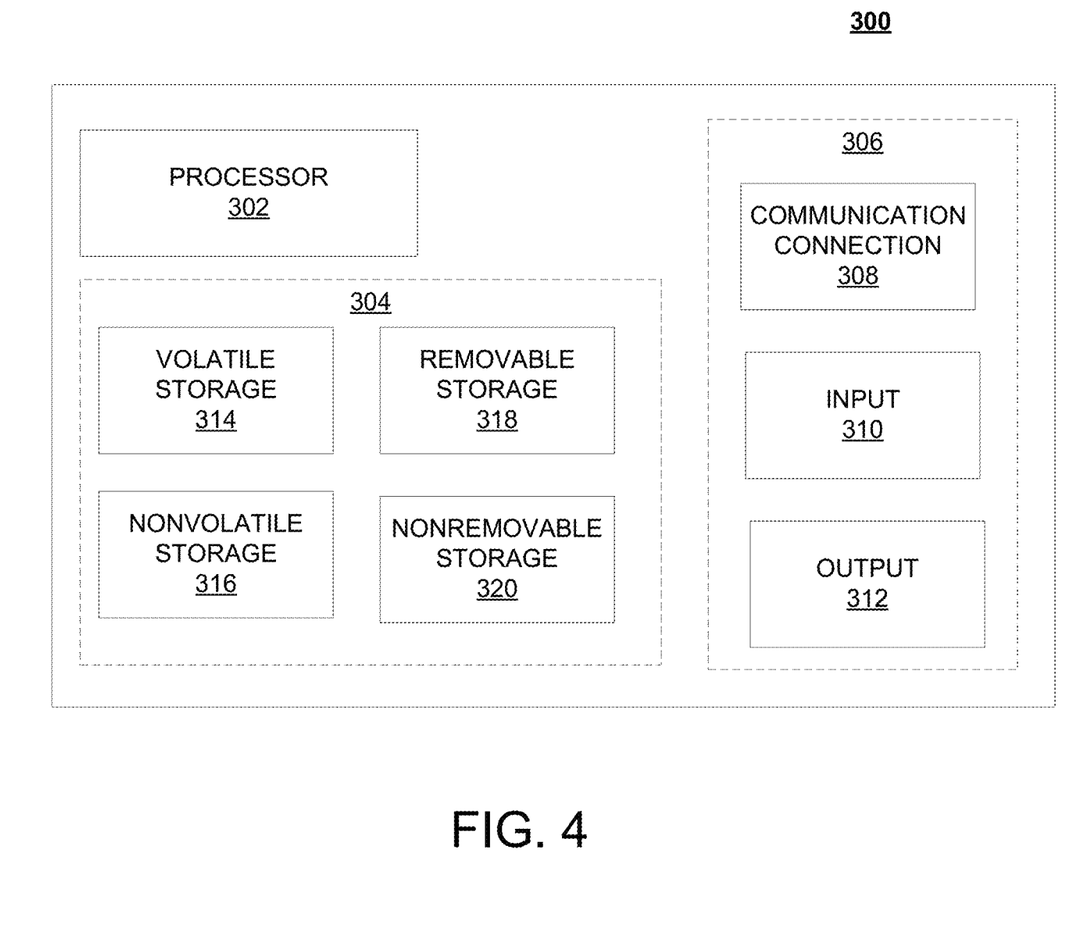
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
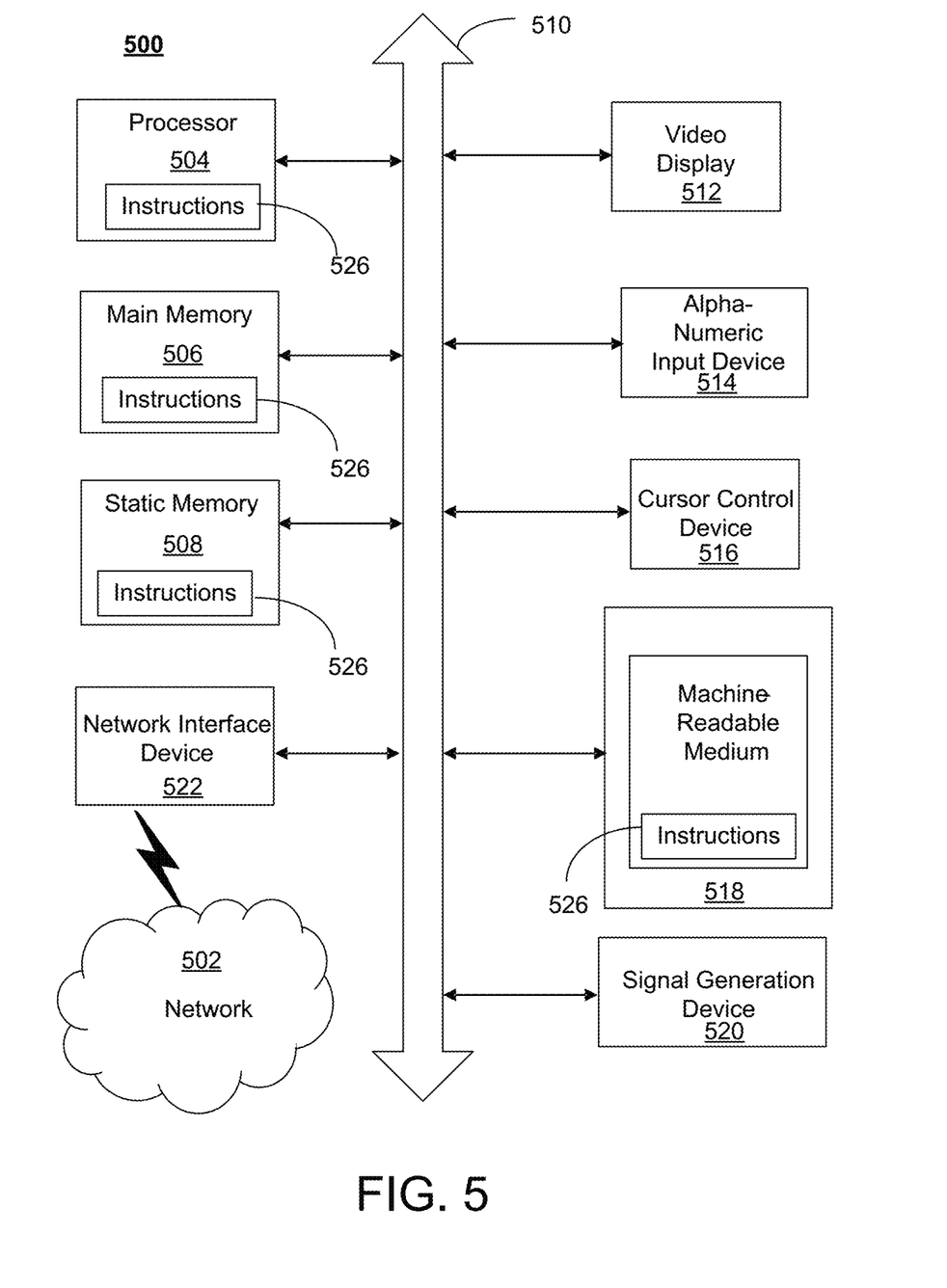
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, computer 102, mobile device 101, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a system in which split input and output remote access for zero trust systems alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—split input and output remote access for zero trust systems or the like—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for split input and output remote access. A method, system, computer readable storage medium, or apparatus provides for receiving a request from a first device for a session with a server; determining that the first device has a first trust level; in response to determining the first device is untrusted, communicating a session identifier to the first device; receiving the session identifier from a second device; determining that the second device has a second trust level; linking the first device and the second device to the session; sending information to be communicated for the session, wherein the first device displays a first subset of the information that is displayable for devices designated at the first trust level; and wherein the second device displays a second subset of the information that is displayable for devices designated at the second trust level. The second subset of information comprises audio, video, or text. The second device is a mobile phone. The information indicates a trust level for each subset of the information. The method, system, computer readable storage medium, or apparatus may provide for receiving a first confirmation message that the first device displayed only untrusted information of the information received by the first device. The method, system, computer readable storage medium, or apparatus may provide for receiving a second confirmation message the second device displayed trusted information and untrusted information of the information received by the first device. Informational labels indicate a trust level for the first subset of the information and the second subset of the information, wherein the first subset of the information is tagged/labeled for/accessible to untrusted devices or trusted devices participating in the session and the second subset of the information is labeled accessible to trusted devices participating; and directing the second subset of information to the trusted devices. Information here can be of any form such as text, audio, or multimedia. Session identifier may link the trusted devices or untrusted devices into a single session where further separation of information may happen between these simultaneous sessions. The information includes tags or other indicators that indicates a trust level for each subset of the information. All combinations in this paragraph (including the removal or addition of steps) are contemplated in a manner that is consistent with the other portions of the detailed description.

What is claimed:

1. A method comprising:
   receiving, by a processing system including a processor, a request from a first device for a session with a server;
   determining, by the processing system, that the first device has a first trust level;
   in response to determining, by the processing system, the first trust level of the first device is untrusted, communicating, by the processing system, a session identifier to the first device;
   receiving, by the processing system, the session identifier from a second device, wherein the second device obtains the session identifier via a QR code;
   determining, by the processing system, that the second device has a second trust level;
   linking, by the processing system, the first device and the second device to the session; and
   sending, by the processing system, information to be communicated for the session,
      wherein the first device displays a first subset of the information that is displayable for devices designated at the first trust level,
      wherein the second device displays a second subset of the information that is displayable for devices designated at the second trust level,
      wherein the first device displays a blurred third subset of the information that is not displayable for devices designated at the first trust level,
      wherein the second device displays the third subset of the information that is displayable for devices designated at the second trust level,
      wherein the first device displays a fourth subset of the information that is displayable for the devices designated at the first trust level,
      wherein the second device displays the fourth subset of the information that is displayable for the devices designated at the second trust level,
      wherein the first device denies accepting user-generated information based on the first device being designated at the first trust level, and
      wherein the second device accepts the user-generated information based on the second device being designated at the second trust level.

2. The method of claim 1, wherein the information comprises tags that indicate a trust level.

3. The method of claim 1, wherein the information comprises text, audio, or video.

4. The method of claim 1, further comprising:
   receiving, by the processing system, a first confirmation message that the first device only input or output untrusted information; and
   receiving, by the processing system, a second confirmation message the second device input or output trusted information and untrusted information.

5. The method of claim 1, wherein the session is for a remote desktop session.

6. The method of claim 1, wherein the first trust level is indicative of being untrusted, and wherein the second trust level is indicative of being trusted.

7. The method of claim 1, wherein the session identifier is communicated via machine-to-machine communication.

8. An apparatus comprising:
   a processing system including a processor; and
   a memory coupled with the processor, the memory storing executable instructions that when executed by the processor cause the processor to effectuate operations comprising:
      receiving a request from a first device for a session;
      determining that the first device has a first trust level;
      in response to determining the first trust level of the first device is untrusted, communicating a session identifier to the first device;
      receiving the session identifier from a second device, wherein the second device obtains the session identifier via a QR code;
      determining that the second device has a second trust level;
      linking the first device and the second device to the session; and
      sending information to be communicated for the session,
         wherein the first device displays a first subset of the information that is displayable for devices designated at the first trust level,
         wherein the second device displays a second subset of the information that is displayable for devices designated at the second trust level,
         wherein the first device displays a blurred third subset of the information that is not displayable for devices designated at the first trust level,
         wherein the second device displays the third subset of the information that is displayable for devices designated at the second trust level,
         wherein the first device displays a fourth subset of the information that is displayable for the devices designated at the first trust level,
         wherein the second device displays the fourth subset of the information that is displayable for the devices designated at the second trust level,
         wherein the first device denies accepting user-generated information based on the first device being designated at the first trust level, and
         wherein the second device accepts the user-generated information based on the second device being designated at the second trust level.

9. The apparatus of claim 8, wherein the information comprises tags that indicate a trust level.

10. The apparatus of claim 8, wherein the information comprises text, audio, or video.

11. The apparatus of claim 8, the operations further comprising:
   receiving a first confirmation message that the first device only input or output untrusted information; and
   receiving a second confirmation message the second device input or output trusted information and untrusted information.

12. The apparatus of claim 8, wherein the session is for a remote desktop session.

13. The apparatus of claim 8, wherein the first trust level is indicative of being untrusted, and wherein the second trust level is indicative of being trusted.

14. The apparatus of claim 8, wherein the session identifier is communicated via machine-to-machine communication.

15. A computer readable storage medium storing computer executable instructions that when executed by a computing device including a processor cause said computing device to effectuate operations comprising:
   receiving a request from a first device for a session with a server;
   determining that the first device has a first trust level;
   in response to determining the first trust level of the first device is untrusted, communicating a session identifier to the first device;
   receiving the session identifier from a second device, wherein the second device obtains the session identifier via a QR code;
   determining that the second device has a second trust level;
   linking the first device and the second device to the session; and
   sending information to be communicated for the session,
      wherein the first device displays a first subset of the information that is displayable for devices designated at the first trust level,
      wherein the second device displays a second subset of the information that is displayable for devices designated at the second trust level,
      wherein the first device displays a blurred third subset of the information that is not displayable for devices designated at the first trust level,
      wherein the second device displays the third subset of the information that is displayable for devices designated at the second trust level,
      wherein the first device displays a fourth subset of the information that is displayable for the devices designated at the first trust level,
      wherein the second device displays the fourth subset of the information that is displayable for the devices designated at the second trust level,
      wherein the first device denies accepting user-generated information based on the first device being designated at the first trust level, and
      wherein the second device accepts the user-generated information based on the second device being designated at the second trust level.

16. The computer readable storage medium of claim 15, wherein the information comprises tags that indicate a trust level.

17. The computer readable storage medium of claim 15, wherein the information comprises text, audio, or video.

18. The computer readable storage medium of claim 15, the operations further comprising:
   receiving a first confirmation message that the first device only input or output untrusted information; and
   receiving a second confirmation message the second device input or output trusted information and untrusted information.

19. The computer readable storage medium of claim 15, wherein the session is for a remote desktop session.

20. The computer readable storage medium of claim 15, wherein the first trust level is indicative of being untrusted, and wherein the second trust level is indicative of being trusted.

* * * * *